(12) United States Patent
Puniani et al.

(10) Patent No.: US 11,159,649 B2
(45) Date of Patent: *Oct. 26, 2021

(54) SYSTEMS AND METHODS OF RATE LIMITING FOR A REPRESENTATIONAL STATE TRANSFER (REST) APPLICATION PROGRAMMING INTERFACE (API)

(71) Applicant: ServiceNow, Inc., Santa Clara, CA (US)

(72) Inventors: Pankaj Puniani, San Diego, CA (US); Bryan Mather Barnard, Kirkland, WA (US); Silas A. Smith, San Diego, CA (US); Matthew Stoddart, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/736,155

(22) Filed: Jan. 7, 2020

(65) Prior Publication Data
US 2020/0220949 A1 Jul. 9, 2020

Related U.S. Application Data

(63) Continuation of application No. 15/906,917, filed on Feb. 27, 2018, now Pat. No. 10,542,124.

(51) Int. Cl.
*H04L 29/06* (2006.01)
*H04L 29/08* (2006.01)
*G06F 9/54* (2006.01)

(52) U.S. Cl.
CPC ............. *H04L 67/42* (2013.01); *G06F 9/54* (2013.01); *H04L 67/10* (2013.01)

(58) Field of Classification Search
CPC ......... H04L 67/42; H04L 67/10; H04L 67/02; G06F 9/54; G06F 9/547
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,678,887 B1 | 1/2004 | Hallman |
| 7,020,706 B2 | 3/2006 | Cates |
| 7,028,301 B2 | 4/2006 | Ding |
| 7,062,683 B2 | 6/2006 | Warpenburg |

(Continued)

*Primary Examiner* — Shirley X Zhang
(74) *Attorney, Agent, or Firm* — Fletcher Yoder PC

(57) ABSTRACT

The present disclosure relates to systems and methods of implementing rate limiting in a representational state transfer (REST) application programming interface (API) system. A method of operating an instance of a REST API server, includes: receiving a REST API request that matches a rate limit rule associated with the instance of the REST API server; preparing a REST API response that includes rate limiting response headers. The method includes determining whether a rate limit violation exists that corresponds to the rate limit rule and, when it does, adding an error message to the REST API response. Otherwise, the REST API request is fulfilled and corresponding data is added to the REST API response. The method includes sending the REST API response including the rate limiting response headers and either the error message or the corresponding data.

20 Claims, 4 Drawing Sheets

(56) References Cited

U.S. PATENT DOCUMENTS

| | | |
|---|---|---|
| 7,131,037 B1 | 10/2006 | LeFaive |
| 7,170,864 B2 | 1/2007 | Matharu |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,743,121 B2 | 6/2014 | De Peuter |
| 8,832,652 B2 | 9/2014 | Meuller |
| 8,887,133 B2 | 11/2014 | Behnia |
| 8,983,982 B2 | 3/2015 | Rangarajan |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,495,227 B2 | 11/2016 | Cooke et al. |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 10,257,113 B2 | 4/2019 | Lawrence, III |
| 10,313,410 B2 | 6/2019 | Bullotta et al. |
| 10,542,124 B2* | 1/2020 | Puniani .................. H04L 67/10 |
| 2006/0146816 A1* | 7/2006 | Jain ..................... H04L 63/1408 370/389 |
| 2008/0209451 A1* | 8/2008 | Michels .................... G06F 9/54 719/328 |
| 2011/0173342 A1* | 7/2011 | Cooper ................. H04L 41/069 709/233 |
| 2013/0132584 A1 | 5/2013 | Palladino et al. |
| 2013/0212603 A1* | 8/2013 | Cooke .................... G06F 9/542 719/328 |
| 2014/0317178 A1 | 10/2014 | Purpura |
| 2015/0229579 A1 | 8/2015 | Kosim-Satyaputra et al. |
| 2015/0350249 A1 | 12/2015 | Reno et al. |
| 2016/0095132 A1* | 3/2016 | Hodroj ................. H04L 47/522 370/235 |
| 2016/0352867 A1 | 12/2016 | Subbarayan et al. |
| 2018/0248807 A1 | 8/2018 | Murphy et al. |
| 2018/0337891 A1 | 11/2018 | Subbarayan et al. |

* cited by examiner

SYSTEMS AND METHODS OF RATE LIMITING FOR A REPRESENTATIONAL STATE TRANSFER (REST) APPLICATION PROGRAMMING INTERFACE (API)

CROSS-REFERENCE TO RELATED APPLICATION(S)

This application is a continuation of U.S. patent application Ser. No. 15/906,917, filed Feb. 27, 2018, which is herein incorporated by reference in its entirety for all purposes.

BACKGROUND

The present disclosure relates generally to systems and methods of implementing rate limiting in a representational state transfer (REST) application programming interface (API) system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Representational state transfer (REST) web services enable client devices to access server-side resources based on a set of stateless operations that are defined by the REST application programming interface (API). REST API servers generally utilize existing Hypertext Transfer Protocol (HTTP) methods (e.g., GET, POST, etc.) to receive and to respond to client requests to manipulate representations of resources. However, the standard REST API does not define a rate limiting mechanism. As such, a client device, or group of client devices, can saturate a standard REST API server with requests that are computationally expensive, which can have negative performance impacts that substantially reduce the responsiveness of the server to other client requests.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments include a method of operating an instance of a REST API server that is part of a REST API system to implement a rate limiting method. The presently disclosed rate limiting method provides customers with the flexibility to create their own rate limit rules for different REST API resources that can customized for different users, roles, and requesting devices. For example, the instance of the REST API server is designed and configured to receive a REST API request (e.g., from a client device), analyze the request, and determine whether or not the request matches a rate limit rule stored by the server. When the request matches a rate limit rule, a REST API response is prepared by the server, including rate limiting headers can provide the client device and/or user with details regarding the rate limited request (e.g., the rate limit rule that matched the REST API request, an amount of time to wait before making a subsequent matching REST API request). After determining the matching rate limit rule, the server determines whether a stored violation matches the rate limit rule. When the server locates a matching violation, the server adds an error message to the REST API response. When the server is unable to locate a matching violation, then the server fulfills the request and adds data related to fulfilling the request to the REST API response. Subsequently, the server provides the REST API response to the requesting device, including the rate limiting headers, and including either the error message or the data related to fulfilling the request.

Additionally, present embodiments include a background process that is executed (e.g., periodically) by an instance of the REST API server to update counts and violations for rate limited requests. During execution of the background process, the server reads information regarding each rate limited REST API request fulfilled by the server. The server uses this information to identify a matching stored rate limit rule, as well as a rate limit and a rate limit count associated with the rate limit rule. When the rate limit count associated with the rate limit rule is greater than or equal to the rate limit associated with the rate limit rule, the server creates a rate limit violation that corresponds to or matches the rate limit rule. Finally, the background process concludes with the server incrementing the rate limit count based on the information regarding the REST API request.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
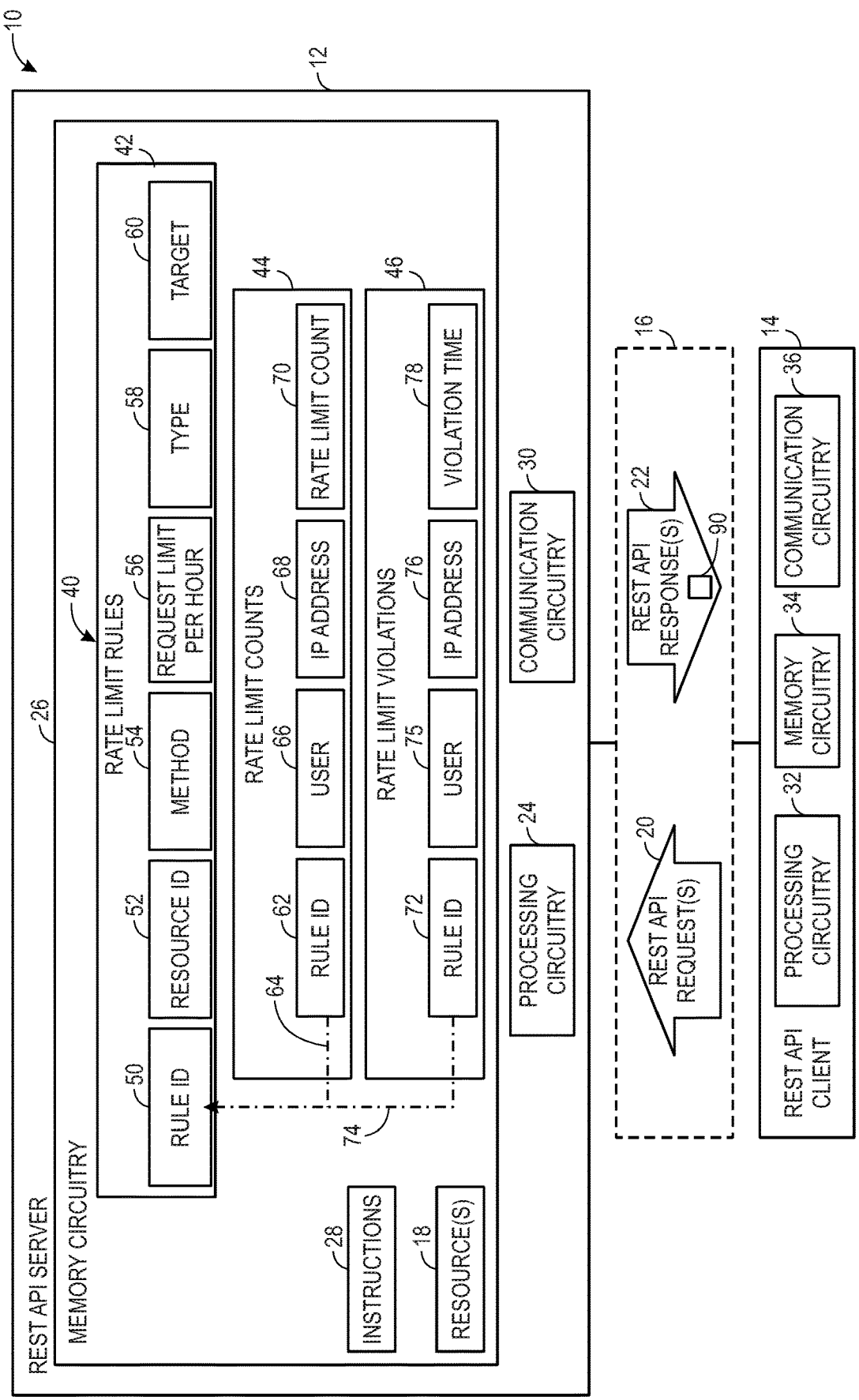
FIG. 1 is a schematic diagram of a representational state transfer (REST) application programming interface (API) system having an instance of a REST API server that enables rate limiting, in accordance with embodiments of the present technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As mentioned, since the standard REST API does not define a rate limiting mechanism, one or more client devices can saturate an instance of a REST API server with computationally expensive requests, substantially reducing the responsiveness of the instance to address other client requests. As such, it is presently appreciated that implementing a rate limiting technique can improve the overall performance and robustness of REST API server instances by restricting such computationally expensive requests. Additionally, it is recognized that a rate limiting technique can further enable prioritization of particular client requests over others, improving the user experience for particular users (e.g., power users, administrators) when the REST API server instances experience periods of heavy usage. However, it is also presently appreciated that, since multiple REST API server instances may be present in a particular REST API system, it is also desirable for the rate limiting technique to provide suitable rate limiting across any desired number of REST API server instances in an effective and efficient manner.

With the foregoing in mind, present embodiments are directed toward systems and methods for implementing such a rate limiting technique in a REST API system. The disclosed rate limiting technique may be implemented in the form of a module (e.g., a set of computer-readable and processor-executable instructions) designed to add rate limiting functionality to the REST API system. The disclosed system includes REST API server instances designed to process both rate limited and non-rate limited requests from client devices in an efficient manner. As discussed in greater detail below, the presently disclosed module enables a REST API server instance to determine whether or not a rate limit rule matches a particular REST API client request, and if so, to determine whether the request is in violation of the matching rate limit rule. The REST API server instances fulfill requests that are not rate limited, as well as requests that are rate limited and are not in violation, and rate limit counts and rate limit violations may be periodically removed (e.g., purged, truncated, cleaned-up) according to a predetermined rate limit time window (e.g., 1 hour). Additionally, as discussed below, the disclosed REST API system can include any suitable number of REST API server instances implementing rate limiting rules consistently across all desired instances of the REST API server. Accordingly, by blocking or restricting certain users from abusing resources associated with the REST API server, the disclosed rate limiting technique enhances and improves the overall experience of users of the REST API system.

As discussed in greater detail below, embodiments of the presently disclosed technique involve comparing incoming REST API client requests to a set of rate limit rules to determine whether or not the incoming request matches a rate limit rule. For requests that match a rate limit rule, the request is compared to a set of rate limit violations to determine whether the request matches a rate limit violation, and an error response is returned to the client device when a matching violation is identified. For requests that have a matching a rate limit rule and lack a matching violation, the request is fulfilled, a response is returned to the client device, and information regarding the fulfillment of the request is added to a queue for processing by a background process. As also discussed below, the background process executes periodically, updating counts of the number of fulfilled rate limited requests based on the user and the Internet protocol (IP) address of the client device making each REST API request. The background process further adds violations to the set of rate limit violations based on the rate limit counts and the rate limit rules. The sets of rate limit rules and rate limit violations can be cached to improve performance, wherein the cache is updated when rules or violations are added, deleted, or otherwise modified. Further, at the end or conclusion of a rate limit time window (e.g., at the end of the current hour), rate limit counts and rate limit violations are removed (e.g., purged, deleted, truncated, moved to a backup table) to reset for the next rate limit time window.

With the foregoing in mind, FIG. 1 is a schematic diagram illustrating a portion an embodiment of a REST API system 10 implementing a rate limiting technique, in accordance with embodiments of the present technique. The illustrated portion of the REST API system 10 includes an instance of a REST API server 12 (hereinafter "server") and a REST API client 14 (hereinafter "client" or "client device") that are communicatively coupled via a suitable network 16 (e.g., a local area network (LAN), a wide area network (WAN), cellular networks, the Internet). It may be appreciated that the REST API system 10 may include any suitable number of instances of the REST API server 12 that enable any desired number of clients 14 to access shared or hosted resources 18. As illustrated, the client 14 sends REST API requests 20 to the REST API server 12 and receives REST API responses 22 from the server 12 via the network 16. As mentioned, the REST API requests 20 and responses 22 may be structured as HTTP requests and responses, which may include additional customized headers, as discussed below. It may be appreciated that the illustrated REST API system 10 may be part of a larger platform, including various computing device acting as servers in datacenters at various geographic locations, and wherein the computing devices are connected together using suitable network and/or Internet connections. In particular, in certain embodiments, the REST API system 10 may be part of an information technology service management (ITSM) platform, a configuration management database (CMDB), or another suitable software platform.

To enable the functionality set forth herein, the illustrated instance of the REST API server 12 is executed or hosted by suitable processing circuitry 24, which may include one or more processors (e.g., one or more central processing units (CPUs)). The processing circuitry 24 is communicatively coupled to suitable memory circuitry 26 (e.g., random access memory (RAM), hard drive, solid state disk (SSD), flash memory drive) that stores instructions 28 associated with the server 12 that is executed by the processing circuitry 24 to provide the functionality set forth herein. The illustrated memory circuitry 26 also stores the resources 18 (e.g., representations of resources) that are accessible to authorized clients 14. In certain embodiments, various variable and property values associated with the server 12, such as the length of rate limit time window and a flag for enabling or disabling rate limiting, may also be stored in the memory circuitry 26. Additionally, the processing circuitry 24 is communicatively coupled to communication circuitry 30 (e.g., a network access card (NIC)) that enables the server 12 to exchange data with other devices on the network 16, including the client 14.

Similarly, the illustrated client 14 may be a computing device, such as mobile phone, a tablet computer, a laptop computer, a notebook computer, a desktop computer, or any other suitable computing device or combination of computing devices. As such, the client 14 includes suitable processing circuitry 32, which may include one or more processors (e.g., one or more central processing units (CPUs)). The processing circuitry 32 is communicatively coupled to suitable memory circuitry 34 (e.g., random access memory (RAM), hard drive, solid state disk (SSD), flash memory drive) that stores instructions to be executed by the processing circuitry 32 of the client 14 to prepare and send REST API requests 20 to the server 12, and to receive and process REST API responses 22 from the server 12. Additionally, the processing circuitry 32 of the client 14 is communicatively coupled to communication circuitry 36 (e.g., a network access card (NIC)) that enables the client 14 to exchange data with other devices on the network 16, including the server 12.

The illustrated memory circuitry 26 stores a number of data structures (e.g., rate limiting tables 40) associated with the server 12 that store information related to the disclosed rate limiting technique (e.g., as part of a relational database structure). For the illustrated example, the illustrated rate limiting tables 40 include: a rate limit rules table 42, a rate limit counts table 44, and a rate limit violations table 46, each of which is discussed below in greater detail. In other embodiments, other data structures (e.g., arrays, linked lists, hash tables) may be used instead of the illustrated tables, in accordance with the present disclosure. Additionally, in certain embodiments, the rate limiting tables 40 may be organized differently and may include different columns or fields than those illustrated for the embodiment of FIG. 1.

The rate limit rules table 42 is generally designed to store information related to each rate limit rule enforced by the server 12. As such, the illustrated example rate limit rules table 42 has a number of columns or fields, including a rule identifier (ID) field 50 that uniquely identifies each rule in the rate limit rules table 42, and which may serve as the primary key of the rate limit rules table 42. The illustrated rate limit rules table 42 includes a resource identifier (ID) field 52 that uniquely identifies which of the resources 18 is associated with each rate limit rule. For example, the resource ID field 52 may be related to a resource ID field of resource table (not illustrated), wherein the resource table stores information related to the resources 18 associated with the server 12. As such, for the illustrated embodiment, each distinct resource ID uniquely identifies a particular resource of the resources 18 of the server 12 that are associated with each rate limit rule.

The illustrated rate limit rules table 42 includes a method field 54 that indicates the HTTP method (e.g., GET, POST, PUT, PATCH, DELETE) of the REST API request 20 for each rate limit rule. The illustrated rate limit rules table 42 also includes a request limit per hour field 56 that indicates a number of matching requests that should be received within the predefined rate limit time window to generate a rate limit violation, after which no further matching requests will be fulfilled until counts and violations are reset at the expiration of the rate limit time window. For example, the request limit per hour field 56 may indicate only an allowed number of matching requests (e.g., 150 requests) will be fulfilled during a particular rate limit time window.

The illustrated rate limit rules table 42 includes a type field 58 that indicates the type of each rate limit rule. For example, in certain embodiments, the type field 58 may indicate that a particular rate limit rule is applicable to one of: a particular user, a particular role, a particular IP address or range of IP addresses, or all client requests. For example, in an embodiment, the type field 58 may store integer values ranging between 0 and 4, enumerated such that a value of 0 indicates a "user" type, a value of 1 indicates "role" type, a value of 2 indicates an "IP address" type, a value of 3 indicates an "IP address range" type, and a value of 4 indicates a type that includes "all client requests". As such, the type field 58 defines the contents a target field 60 of the rate limit rules table 42. For example, when the type field 58 indicates a particular user, the target field 60 may indicate the identity of the particular user. When the type field 58 indicates a particular role, the target field may indicate the identity of the particular role (e.g., a custom_integration role). In certain embodiments, the identity of the particular user or the identity of the particular role may be identifiers (e.g., user ID, role ID) that reference information stored in a user or role table associated with the server 12. When the type field 58 indicates a particular IP address or range of IP addresses, the target field may indicate a string of characters or a numerical value that indicates an IP address (e.g., 10.10.10.10) or that indicates a range of IP addresses, for example, using wildcard notation (e.g., 10.10.x.x) or a range notation (e.g., 10.10.10.10-10.10.10.70). When the type field 58 indicates all client requests, regardless of the user, role, or IP address/range, then the target field may not be populated, or may be set to true. As discussed below, it may be appreciated that, while rate limiting rules can be defined for roles (which can include multiple users) and for IP address ranges (which can include multiple IP addresses), counts of fulfilled requests and violations are stored in the rate limit counts table 44 and the rate limit violations table 46 on a per user/per IP address basis, as discussed below. As such, for clarity, rate limit rules having a value in the type field 58 that indicates multiple potential clients/users (e.g., type indicating role, IP address range, or all requests) are referred to herein as "aggregate-type rate limit rules," while rate limit rules having a value in the type field 58 that indicates a single client/user (e.g., IP address or user) are referred to herein as "non-aggregate-type rate limit rules," as discussed in greater detail below.

The rate limit counts table 44 is generally designed to store information related to current counts of fulfilled requests that correspond to rate limit rules enforced by the server 12. As such, the rate limit counts table 44 includes a rule identifier (ID) field 62 that references the rule ID field 50 of the rate limit rules table 42, as indicated by the arrow 64. Additionally, appreciating that there is a one-to-many relationship between the rate limit rules table 42 and the rate limit counts table 44, the rate limit counts table 44 also includes a user field 66 and an IP address field 68 that identifies the user and IP address that made fulfilled REST API requests. For example, for a rate limit rule having a type field 58 and a target field 60 indicating a particular role, then the rate limit counts table may include multiple records or rows that have the same value for the rule ID fields 62 and different values for the user fields 66 and/or the IP address fields 68. That is, for this example, if two client requests were fulfilled for two different users, both having the same role, then the rate limit counts table 44 would include separate records for the two of client requests. For the two records, the rule ID field 50 would have the same value, while the user field 66 and the IP address field 68 would be distinct, reflecting the respective user and IP address for the client 14 making the REST API requests 22. The rate limit counts table 44 also includes a rate limit count field 70, which stores an integer value indicating a number of fulfilled REST API requests within the current rate limit time window.

The rate limit violations table 46 is generally designed to store information related to violations generated during the current rate limit time window for each rate limit rule enforced by the server 12. As such, the rate limit violations table 46 includes a rule identifier (ID) field 72 that references the rule ID field 50 of the rate limit rules table 42, as indicated by the arrow 74. Like the rate limit counts table 44 discussed above, appreciating that there is a one-to-many relationship between the rate limit rules table 42 and the rate limit violations table 46, the rate limit violations table 46 also includes a user field 75 and an IP address field 76 that indicates the particular violator of the rate limiting rule. For example, for a rate limit rule having a type field 58 and a target field 60 indicating a range of IP addresses, the rate limit violations table 46 may include multiple records or rows that have the same value in the rule ID field 72. That is, for this example, if two respective client requests were fulfilled for two respective users, both having a respective IP address within the range of IP addresses indicated by the rate limit rule, then the rate limit violations table would include a separate record for each of the two violations. For the two records, the rule ID field 72 would have the same value, while the user field 75 and the IP address fields 76 would be distinct, reflecting the respective user and IP address associated with each respective violation. The illustrated rate limit violations table 46 also includes a violation time field 78 that indicates a time (e.g., a time stamp, an indication of a particular rate limit time window) at which or during which the violation occurred. For example, for embodiments having a one hour rate limit time window, the violation time field 78 may indicate the appropriate one hour window (e.g., January 30$^{th}$ at 2-3 AM) in which the violation was created in the rate limit violations table 46.

Figure 2:
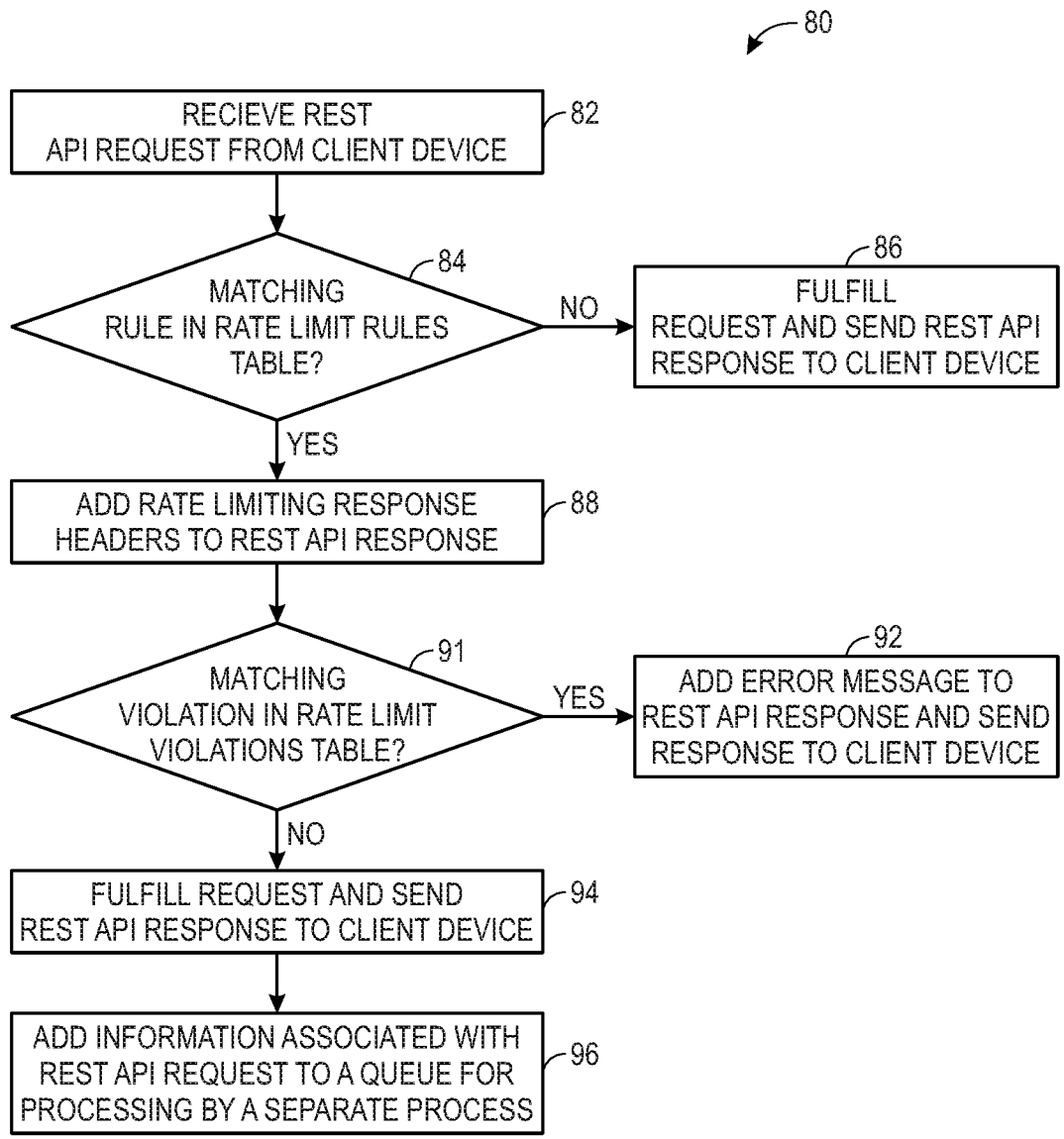
FIG. 2 is a flow diagram of an embodiment of a process whereby the instance of the REST API server receives and responds to a REST API request from a REST API client, in accordance with a disclosed rate limiting technique.

FIG. 2 is a flow diagram illustrating an embodiment of a process 80 whereby the instance of the REST API server 12 implements the disclosed rate limiting technique. The illustrated process 80 begins with the processing circuitry 24 receiving (block 82) a REST API request 20 from the client device 14. In other embodiments, a REST API request 20 may be received from another instance of a REST API server 12, or another suitable device. Next, the processing circuitry 24 compares the received REST API client request 20 to a cached copy of the rate limit rules table 42 to determine (block 84) whether the request matches a rate limit rule. If a matching rate limit rule is not located, then the REST API request is fulfilled and a REST API response is prepared and sent to the requesting client device accordingly (block 86). It may be appreciated that a single REST API request can match with (e.g., meet the criteria of) more than one rule in the rate limit rules table 42. As such, in certain embodiments, the processing circuitry 24 may determine multiple corresponding rate limit rules in the rate limit rules table 42 for the REST API request 20, and select a highest priority rate limit rule as the matching rate limit rule based on a predetermined priority. For example, in an embodiment, a rate limit rule in the rate limit rules table 42 having a type field 58 indicating IP address or IP address range is given priority over rate limit rules having a type field 58 indicating user, which is given priority over rate limit rules having a type field 58 indicating role, which is given priority over rate limit rules having a type field 58 indicating all requests. Additionally, in certain embodiments, since it is recognized that the rate limit rules table 42 will generally remain small and not frequently be modified, the rate limit rules table 42 may be cached to improve performance during the comparison of block 84, and the cache may be updated when the rate limit rule table 42 is modified.

If a matching rate limit rule is located in block 84, then a REST API response 22 is prepared (block 88) that includes rate limiting response headers. For example, in certain embodiments, the REST API response 22 may include rate limiting response headers 90, as illustrated in FIG. 1, that indicate to the client device 14 that the received REST API request 20 was subject a rate limit rule. By way of specific example, in certain embodiments, the rate limiting response headers 90 may include a rule identifier (ID) field that indicates the identity of the matching rate limit rule, which may be populated using the rule ID field 50 for the matching rate limit rule identified in block 84. In certain embodiments, the rate limiting response headers 90 may include the rate limit field, which may be populated using the request limit per hour field 56 for the matching rule identified in block 84. As such, this rate limit field indicates to the client device 14 the maximum number of rate limited request allowed per each rate limit time window for each rate limit rule. In certain embodiments, the rate limiting response headers 90 may include a rate limit reset field that indicates a time (e.g., in UTC epoch seconds) at which the current predefined rate limit time window ends. For example, if the REST API client request 20 is received on February 1st at 2:30 AM, the previous rate limit time window began on February 1st at 2:00 AM, and the rate limit time window has a 1 hour length, then the rate limiting response headers 90 in the REST API response 22 may indicate a rate limit reset field value of February 1 at 3 AM (e.g., in UTC epoch seconds).

Continuing through the embodiment of the process 80 illustrated in FIG. 2, after adding the rate limiting response headers 90, the processing circuitry 24 compares the REST API request 20 to the rate limit violations table 46 to determine whether the request matches a rate limit violation (block 91). While it may be possible for the REST API request to match with multiple violations stored in the rate limit violations table 46, in certain embodiments, the processing circuitry 24 discontinues further comparison after a first corresponding violation is located. In other embodiments, when multiple corresponding violations are located, then the corresponding violation having a highest relative priority may be determined to match the REST API request, as discussed above. When a matching violation is determined to be present in the rate limit violations table 46, and an error message is added (block 92) to the REST API response 22, and the response 22 is sent to the client device 14. For example, in certain embodiments, an HTTP status or error message is added to the REST API response, such as a HTTP 429, which indicates "too many requests" to the client device 14. Furthermore, additional rate limiting response headers 90 may be added to the REST API response 22, such as a "retry after" field that indicates how long to wait before making a subsequent request (e.g., in seconds). For example, the "retry after" field may indicate that rate limit counts and violations will be reset at the close of the predetermined rate limit time window, and that this time window will end in a particular amount of time (e.g., 600 seconds). Additionally, in certain embodiments, the rate limit violations table 46 may be cached to improve performance during the comparison of block 91, and that the cache may be updated in response to modifications of the rate limit violations table 46.

When the processing circuitry 24 determines that the REST API request 20 does not have a matching violation in the rate limit violations table 46, the request is fulfilled and a REST API response 22 is returned to the client device 14 (block 94). Additionally, information regarding the fulfillment of the REST API request 20 is added (block 96) to a queue for processing by the background process, as discussed, to update the rate limit counts table 44 and the rate limit violations table 46, as appropriate, based on the fulfilled REST API request 20. While described herein as a queue, it may be appreciated that the processing circuitry 24 executing the process 80 may provide the information to the background process via any suitable inter-process methods of data exchange (e.g., thread-safe cache, concurrent hash map). For example, in certain embodiments, in block 96, the processing circuitry 24 may add information regarding the fulfilled REST API request to a predetermined memory location, or as a record in a particular table (e.g., a fulfilled rate limited requests table) to subsequently be processed by the background process. It may be appreciated that the present design enables the exchange of data between these processes without the use of distributed cache, which reduces the cost and complexity of the presently disclosed technique compared to other rate limiting techniques.

Figure 3:
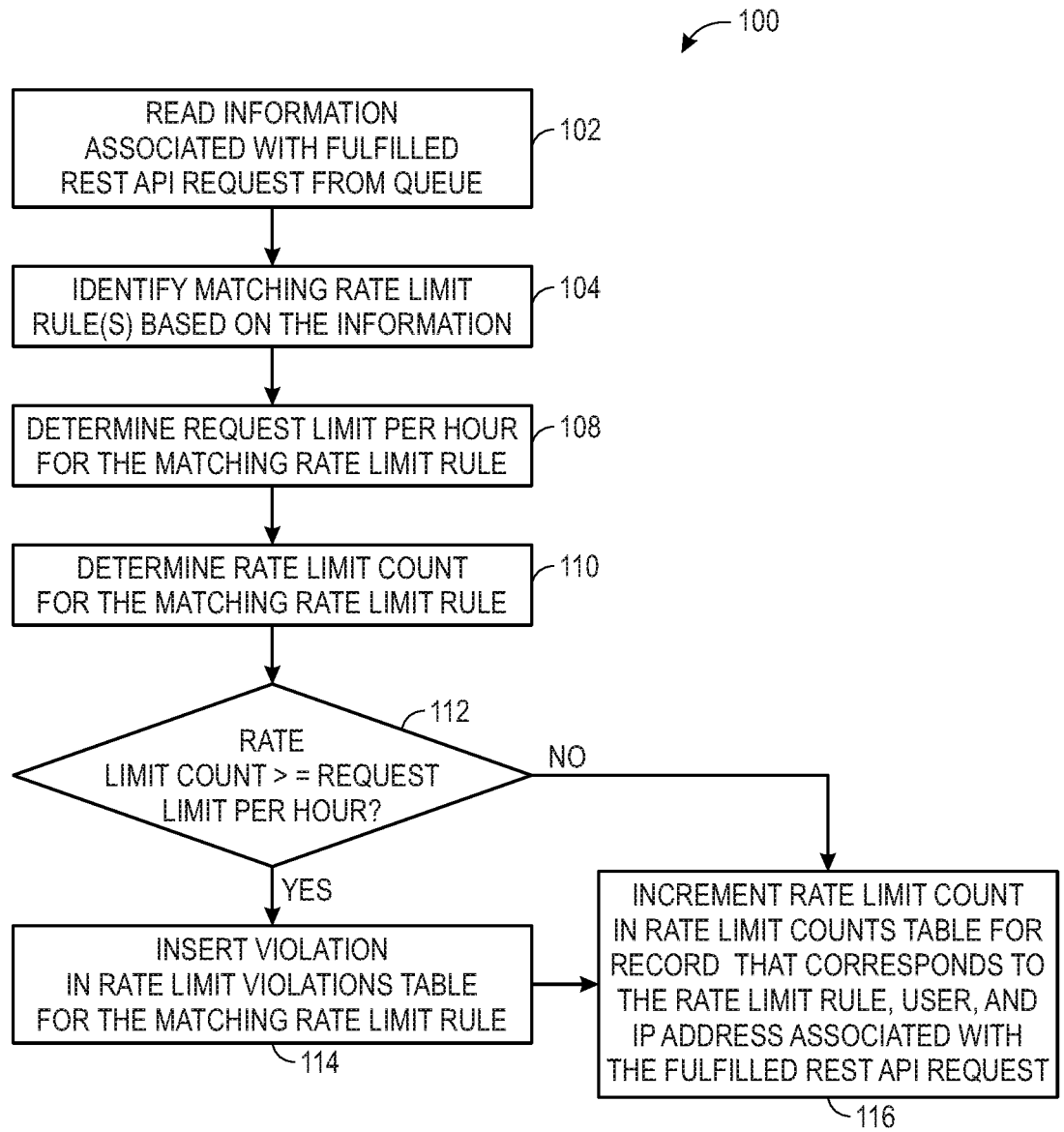
FIG. 3 is a flow diagram of an embodiment of a background process that updates rate limit counts and rate limit violations based on fulfilled REST API requests, in accordance with embodiments of the present technique.

As mentioned, the processing circuitry 24 executes the aforementioned background process responsible for processing information regarding fulfilled REST API requests and updating the rate limit counts table 44 and rate limit violations table 46 accordingly. An example embodiment of the background process 100 is illustrated in FIG. 3, which may also be part of the aforementioned instructions 28 illustrated in FIG. 1. In certain embodiments, the background process 100 is executed by the processing circuitry 24 periodically (e.g., every 30 seconds, every 60 seconds, every 5 minutes), while in other embodiments, the execution of the background process 100 is triggered by the addition of information regarding a newly fulfilled REST API request to the aforementioned queue. It may also be appreciated that, in certain embodiments, a single background process 100 can handle information populated by any suitable number of instances of the process 80 (e.g., four instances of the process 80 and one instance of the background process 100 per instance of the REST API server), which reduces overhead and improves overall performance of the REST API system 10.

The embodiment of the background process 100 illustrated in FIG. 3 begins with the processing circuitry 24 reading (block 102) information associated with a fulfilled REST API request 20 from the queue that was populated in block 96 of FIG. 2, as discussed above. The processing circuitry 24 identifies (block 104) a matching rate limit rule by comparing the information regarding the fulfilled request to the rate limit rules table 42. For example, the processing circuitry 24 may match the information associated with the fulfilled REST API request 20 to a first rule based on the user generating the request, to a second rule based on the role of the user generating the request, to a third rule based on the IP address range of the user generating the request, and so forth. In certain embodiments, when the processing circuitry 24 determines that the information associated with the fulfilled REST API request 20 corresponds to a plurality of rules, the processing circuitry 24 selects the highest priority matching rate limit rule as the matching rate limit rule, based on the priorities discussed above, and discards or ignores the remaining matching rate limit rules.

For the embodiment of the process 100 illustrated in FIG. 3, in block 108, the processing circuitry 24 determines the request limit per hour from the request limit per hour field 56 of the matching rate limit rule in the rate limit rules table 42. Additionally, the processing circuitry 24 determines (block 110) a rate limit count for the particular rate limit rule. For example, when the particular matching rate limit rule is a non-aggregate-type rate limit rule, then the processing circuitry 24 can determine the rate limit count directly from the rate limit count field 70 of a single record in the rate limit counts table 44 that matches or corresponds to the particular rate limit rule. When the particular rate limit rule is an aggregate-type rate limit rule (e.g., role or IP address range), then the processing circuitry 24 can determine the rate limit count by summing the respective rate limit count fields 70 for all records in the rate limit counts table 44 that match or correspond to the particular aggregate rate limit rule. For example, when the particular rate limit rule has a type that indicates role, then, in block 110, the processing circuitry 24 may sum the individual rate limit count field 70 for a plurality of records in the rate limit counts table 44 that match or correspond to the particular rate limit rule to determine the rate limit count for the particular aggregate-type rate limit rule.

Subsequently, as indicated in block 112, the processing circuitry 24 compares the rate limit count determined in block 110 to the request limit per hour determined in block 108. When the rate limit count is greater than or equal to the request limit per hour, a violation is inserted (block 114) into the rate limit violations table 46. After inserting the violation into the rate limit violations table 46 in block 114, or after determining that the rate limit count is less than the respective request limit per hour in block 112, the processing circuitry 24 increments (block 116) the rate limit count field 70 for the record in the rate limit counts table 44 having a rule ID field 62 that matches the rule ID 50 of corresponding rate limit rule, as well as the user and the IP address of the client device 14 that made the REST API request 20, as indicated in the information read in block 102. If such a corresponding record cannot be located in the rate limit counts table 44, a new record may be created in the rate limit counts table 44 based on the information associated with the fulfilled REST API request that identifies particular rate limit rule, as well as the user and the IP address that submitted the REST API request 20.

In an example of executing the embodiment of the process 100 illustrated in FIG. 3, the processing circuitry 24 locates two corresponding rate limit rules from the rate limit rules table 42 based on the information regarding the fulfilled REST API request in blocks 102 and 104: a first rule having a type indicating a user, a request limit per hour of 150, and a rate limit count of 150; a second rule having a type indicating a role, and a request limit per hour of 250, and a rate limit count of 150. The processing circuitry 24 identifies the higher priority rate limit rule, namely the first rule, as the matching rate limiting rule in block 104. For this example, in block 112, the processing circuitry 24 determines that the respective rate limit count is greater than or equal to the request limit per hour for the first rate limit rule. Accordingly, in block 114, a violation is inserted into the rate limit violations table 46 with respect to the first rule, while no violation is inserted with respect to the second rule. As such, future REST API requests from the same user that are received within the predetermined rate limit time window will be answered by the processing circuitry 24 with the error indicated in block 92 of FIG. 2. Continuing through the example, in block 116, the rate limit count field 70 is incremented for the record in the rate limit counts table 44 that matches or corresponds to the rate limit rule, the user, and the IP address associated with the fulfilled REST API request 20.

Figure 4:
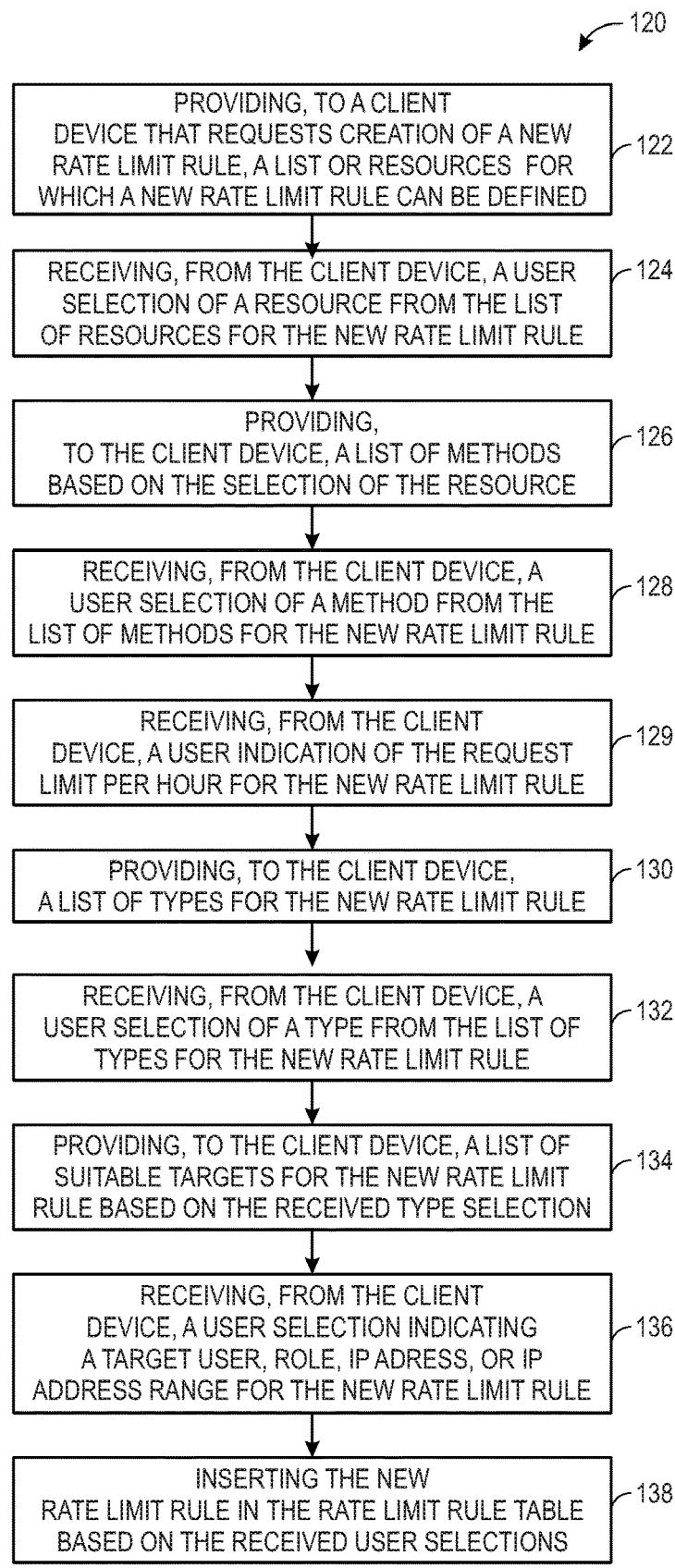
FIG. 4 is a flow diagram of an embodiment of a process whereby the instance of the REST API server provides information to and receives selections from a user to define a new rate limit rule, in accordance with embodiments of the present technique.

FIG. 4 is a flow diagram illustrating an embodiment of a process 120 whereby the instance of the REST API server 12 cooperates with the client device 14 to create a new rate limit rule. For example, the illustrated process 120 may be executed by the processing circuitry 24 in response to the server 12 receiving a request from a user having suitable privileges (e.g., an administrator, web_service_admin role) to create new rate limit rule. The illustrated process 120 begins with the processing circuitry 24 providing (block 122), to a client device 14 requesting creation of a new rate limit rule, a list of suitable resources 18 for which a new rate limit rule can be defined. The client device 14 may then utilize the received list of suitable resources 18 to populate a list of selectable options (e.g., a drop-down menu, a set of radio buttons, select boxes) from which the user can select the desired resource for which to define the new rate limit. The illustrated process 120 continues with the processing circuitry 24 receiving (block 124), from the client device, a selection of a particular resource from the list of suitable resources 18 provided in block 122, and this selection is used to set the resource ID field 52 of the new rate limit rule.

The illustrated embodiment of the process 120 continues with the processing circuitry 24 providing (block 126), to the client device, a list of suitable methods (e.g., GET, POST, PUT, PATCH, DELETE) based on the received selection of the resource received in block 124. The client device 14 may then utilize the received list of suitable methods to populate a list of selectable options from which the user can select the desired method for the new rate limit. The illustrated process 120 continues with the processing circuitry 24 receiving (block 128), from the client device, a selection of the method from the list of suitable methods provided in block 126, and this selection is used to set the method field 54 of the new rate limit rule. Additionally, in the illustrated embodiment, the processing circuitry 24 receives (block 129), from the client device, a user indication (e.g., an integer value) of the request limit per hour for the new rate limit rule.

The illustrated process 120 continues with the processing circuitry 24 providing (block 130), to the client device, a list of suitable types (e.g., user, host, IP address, IP address range, all client requests). The client device 14 may then utilize the received list of suitable types to populate a list of selectable options from which the user can select the desired type for the new rate limit. The illustrated process 120 continues with the processing circuitry 24 receiving (block 132), from the client device, a selection of the type from the list of suitable types provided in block 130, and this selection is used to set the type field 58 of the new rate limit rule.

The illustrated process 120 continues with the processing circuitry 24 providing (block 134), to the client device 14, a list of suitable targets based on the received type selection in block 132. For example, when the received type selection indicates user, then the processing circuitry 24 may provide to the client device 14 a list of suitable users (e.g., from a user table) for the new rate limit rule in block 134. When the received type selection indicates role, then the processing circuitry 24 may provide to the client device 14 a list of suitable roles (e.g., from a roles table) for the new rate limit rule in block 134. When the received type selection indicates an IP address or an IP address range, then the processing circuitry 24 may provide to the client device 14 a list of suitable IP addresses for the new rate limit rule. The client device 14 may then utilize the received list of suitable users, hosts, or IP addresses to populate a list of selectable options from which the user can select the desired target for which to define the new rate limit. The illustrated process 120 continues with the processing circuitry 24 receiving (block 136), from the client device 14, a selection of the target from the list of suitable types provided in block 134, and this selection is used to set the target field 60 of the new rate limit rule.

The illustrated process 120 concludes with the processing circuitry 24 inserting the new rule in the rate limit rules table 42 based on the received user selections of blocks 124, 128, 132, and 134. As mentioned, in certain embodiments, the rate limit rules table 42 may be cached to improve the performance of the REST API server 12, particularly during execution of the process 80 of FIG. 2. For such embodiments, the cached rate limit rules table is updated upon inserting the new rate limit rule into the rate limit rules table 42.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A representational state transfer (REST) system, comprising:
   memory circuitry storing a rate limit rules table, a rate limit counts table, and a rate limit violations table; and
   processing circuitry operatively coupled to the memory circuitry and configured to execute instructions stored in the memory circuitry to cause the REST system to:
   receive, from a client device, a REST request that corresponds to a rate limit rule stored in the rate limiting rules table;
   determine, from the rate limit counts table, a rate limit and a rate limit count that correspond to the rate limit rule;
   determine that the rate limit count is greater than or equal to the rate limit, and in response, add to the rate limit violation table a rate limit violation record that corresponds to the rate limit rule;
   determine that the rate limit violation record has been added to the rate limit violations table, and in response, preparing a REST response that includes an error message and at least one of: a rule identifier field indicating an identity of the rate limit rule, a rate limit field indicating the rate limit of the rate limit rule, a reset time field indicating a time at a conclusion of a current rate limit time window of the rate limit rule, or a retry after field indicating an amount of time remaining in the current rate limit window, or any combination thereof; and
   sending, to the client device, the REST response that includes the error message.

2. The REST system of claim 1, comprising communication circuitry operatively coupled to the processing circuitry and the memory circuitry, wherein the communication circuitry is configured to communicatively couple the REST server to the client device to receive the REST request from the client device and to send the REST response to the client device via a network.

3. The REST system of claim 1, wherein to determine the rate limit count, the processing circuitry is configured to sum respective rate limit counts of a plurality of rate limit count records from the rate limit counts table, wherein each of the plurality of rate limit count records corresponds with the rate limit rule.

4. The REST system of claim 1, wherein the processing circuitry is configured to execute the instructions to cause the REST system to:
reset the rate limit count in the rate limit counts table and remove the rate limit violation record from the rate limit violations table at a conclusion of a predefined rate limit time window stored in the rate limit rules table for the rate limit rule.

5. The REST system of claim 1, wherein the REST response includes rate limiting response headers, wherein the rate limiting response headers include information related to the rate limit rule.

6. The REST system of claim 5, wherein the rate limiting response headers include the rate limit field.

7. The REST system of claim 5, wherein the rate limiting response headers include the reset time field.

8. The REST system of claim 5, wherein the rate limiting response headers include the retry after field.

9. The REST system of claim 1, wherein the processing circuitry is configured to execute the instructions to cause the REST system to:
determine that the REST request meets criteria of a plurality of rate limit rules stored in the rate limit rules table; and
select a highest priority rate limit rule from the plurality of rate limit rules as the rate limit rule that corresponds to the REST request.

10. The REST system of claim 9, wherein the processing circuitry is configured to execute the instructions to cause the REST system to:
select the highest priority rate limit rule based on a respective type of each of the plurality of rate limiting rules, wherein a highest priority is assigned to a first type of rate limiting rule that is based on the client device having a particular IP address or IP address range, a second highest priority is assigned to a second type of rate limiting rule that is based on the REST request being generated by a particular user, and a third highest priority is assigned to a third type of rate limiting rule that is based on the REST request being generated by a particular role.

11. A method of operating a representational state transfer (REST) server, comprising:
receiving, at the REST server, a REST request that corresponds to a rate limit rule;
determining a rate limit and a rate limit count that corresponds to the rate limit rule;
determining that the rate limit count is greater than or equal to the rate limit, and in response, generating a rate limit violation associated with the rate limit rule;
determining that the rate limit violation has been generated, and in response, preparing a REST response that includes an error message and at least one of: a rule identifier field indicating an identity of the rate limit rule, a rate limit field indicating the rate limit of the rate limit rule, a reset time field indicating a time at a conclusion of a current rate limit time window of the rate limit rule, or a retry after field indicating an amount of time remaining in the current rate limit window, or any combination thereof; and
sending, from the REST server, the REST response including the error message.

12. The method of claim 11, comprising:
incrementing the rate limit count after generating the rate limit violation.

13. The method of claim 11, comprising:
receiving, at the REST server, a second REST request that corresponds to the rate limit rule;
determining that the rate limit violation has been generated, and in response, preparing a second REST response that includes a second error message; and
sending, from the REST server, the REST response including the second error message.

14. The method of claim 11, comprising:
resetting the rate limit count and removing the rate limit violation at a conclusion of a predefined rate limit time window associated with the rate limit rule.

15. The method of claim 14, comprising:
receiving, at the REST server, a second REST request that corresponds to the rate limit rule after the conclusion of the predefined rate limit time window;
determining that the rate limit count is less than the rate limit, and in response, fulfilling the second REST request and preparing a second REST response that includes a set of data generated by fulfilling the second REST request;
incrementing the rate limit count; and
sending, from the REST server, the REST response including the generated set of data.

16. The method of claim 15, wherein preparing the REST response comprises including rate limiting response headers in the REST response, wherein the rate limiting response headers include the retry after field.

17. The method of claim 11, wherein preparing the REST response comprises including rate limiting response headers in the REST response, wherein the rate limiting response headers include the rate limit field and the reset time field.

18. The method of claim 11, wherein the rate limiting rule is stored in a cached rate limiting rules table and the rate limit violation is stored in a cached rate limit violations table of a database associated with the REST server.

19. One or more non-transitory, computer-readable media at least collectively storing instructions of a representational state transfer (REST) server that are executable by processing circuitry of a computing system, the instructions comprising instructions to:
receive a REST request that corresponds to a rate limit rule;
determine a rate limit and a rate limit count that corresponds to the rate limit rule;
determine that the rate limit count is greater than or equal to the rate limit, and in response, generate a rate limit violation associated with the rate limit rule;
determine that the rate limit violation has been generated, and in response, prepare a REST response that includes an error message and at least one of: a rule identifier field indicating an identity of the rate limit rule, a rate limit field indicating the rate limit of the rate limit rule, a reset time field indicating a time at a conclusion of a current rate limit time window of the rate limit rule, or a retry after field indicating an amount of time remaining in the current rate limit window, or any combination thereof; and
send the REST response including the error message.

20. The media of claim 19, wherein the instructions comprise instructions to:
reset the rate limit count and remove the rate limit violation at a conclusion of a rate limit time window associated with the rate limit rule;

receive a second REST request that corresponds to the rate limit rule after the conclusion of the rate limit time window;
determine that the rate limit count is less than the rate limit, and in response, fulfill the second REST request and prepare a second REST response that includes a set of data generated by fulfilling the second REST request;
increment the rate limit count; and
send, from the REST server, the REST response including the generated set of data.

* * * * *